Dec. 24, 1929.  J. J. LILDAL  1,740,823
GEAR SHIFTING APPARATUS
Filed Jan. 25, 1929  4 Sheets-Sheet 1
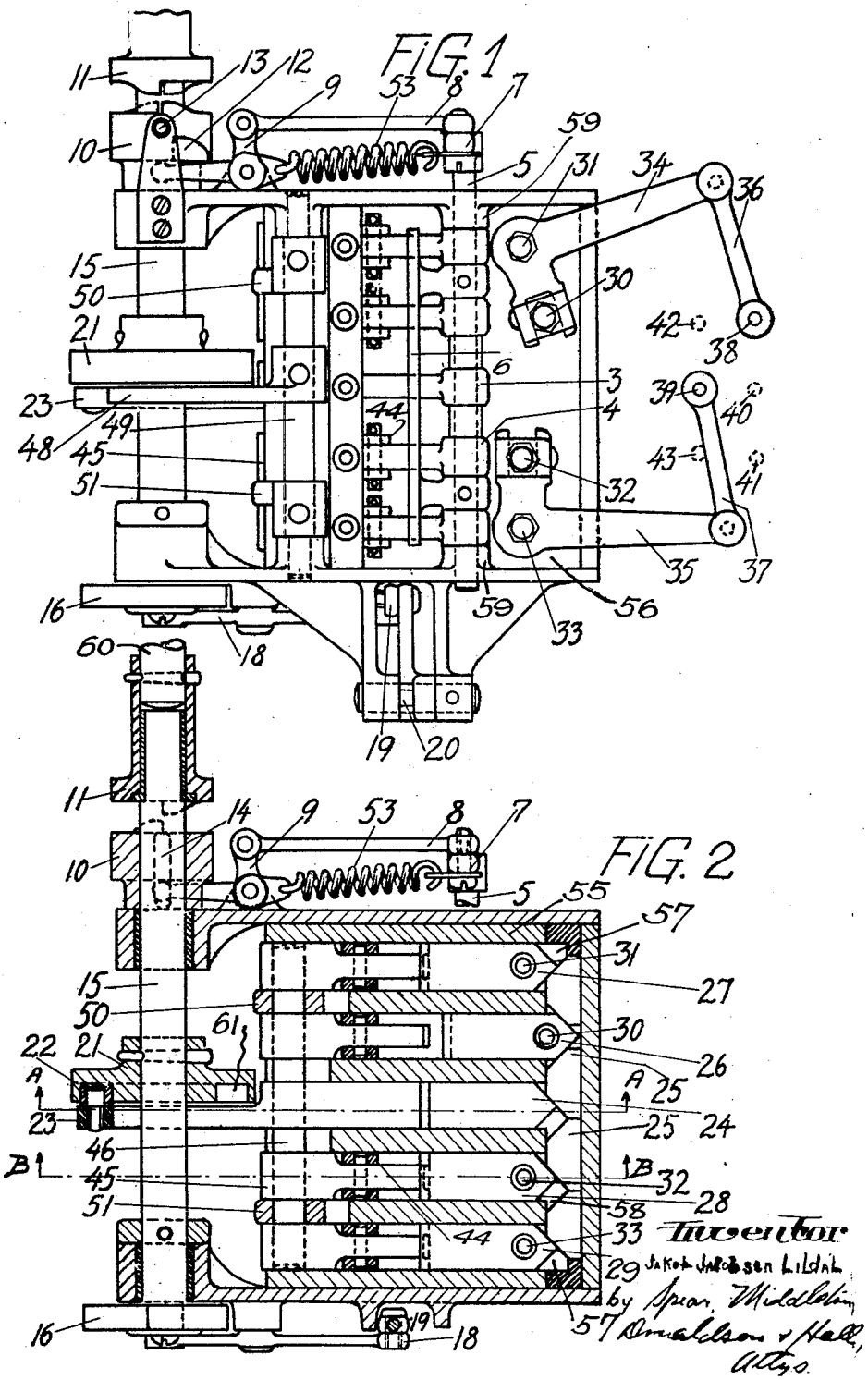

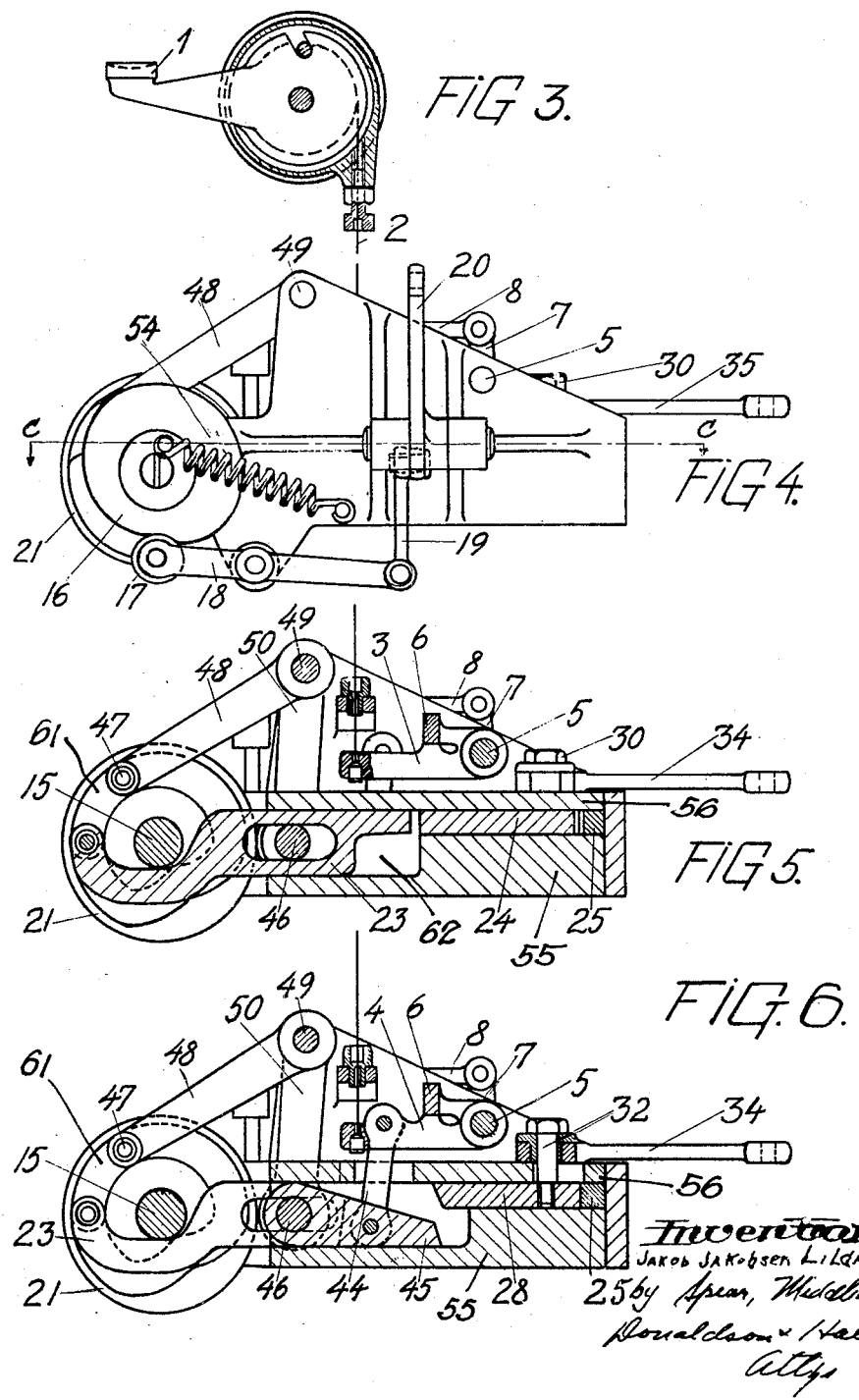

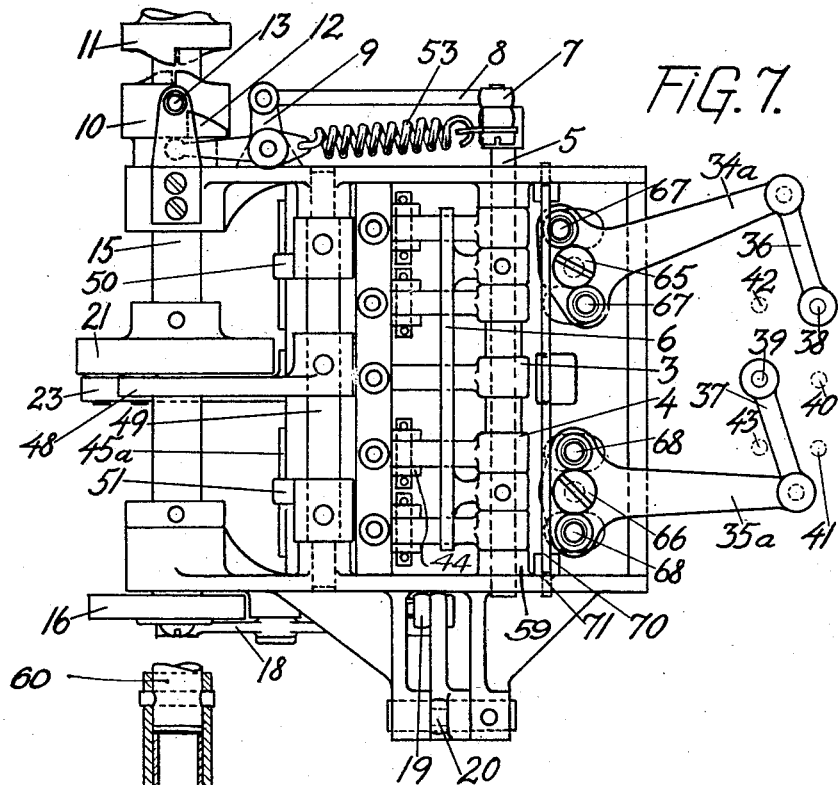
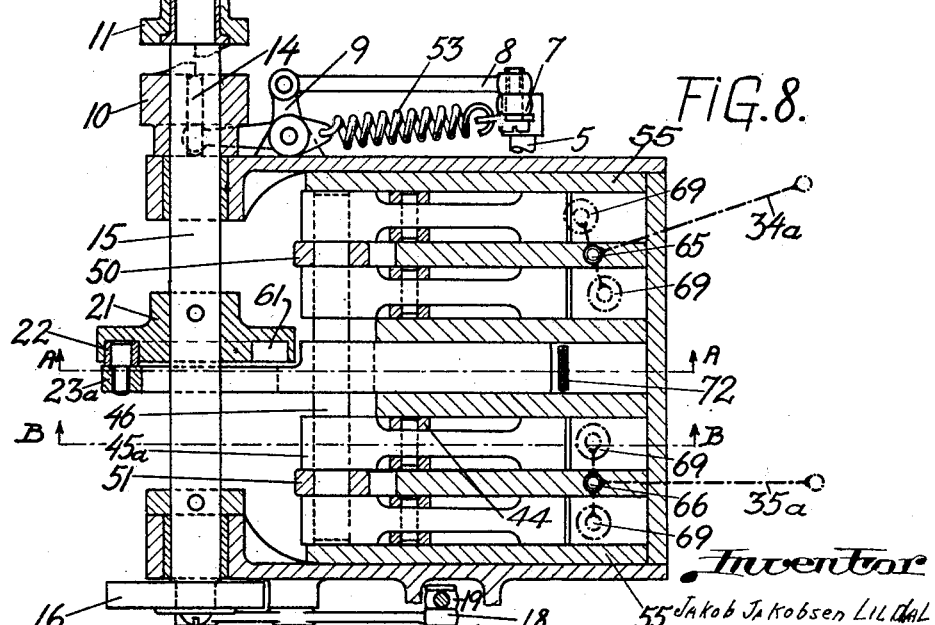

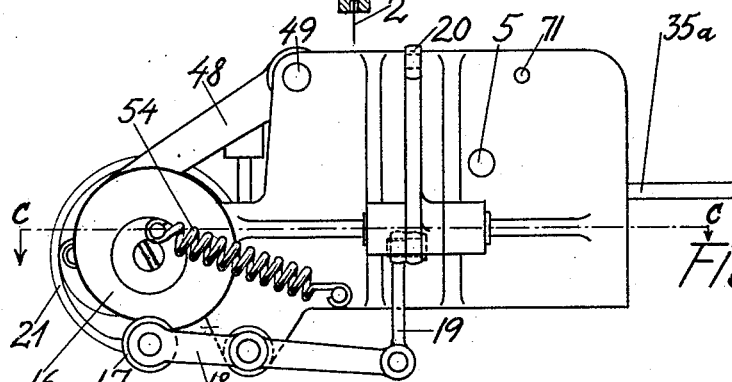
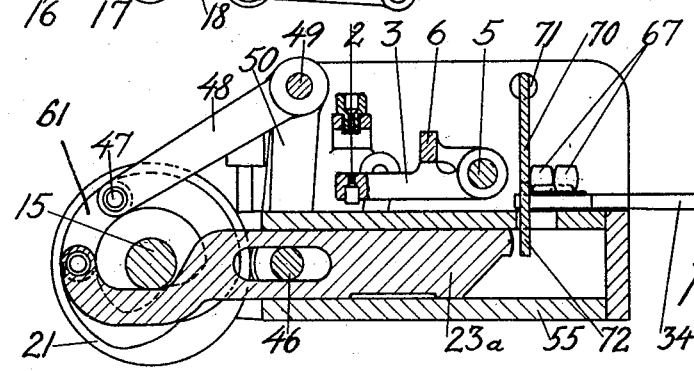
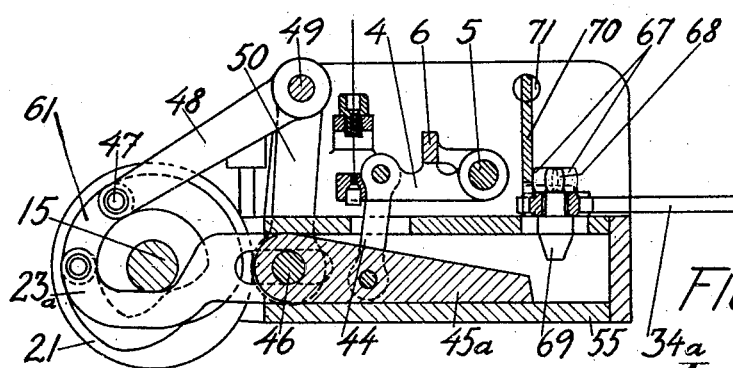

Patented Dec. 24, 1929

1,740,823

UNITED STATES PATENT OFFICE

JAKOB JAKOBSEN LILDAL, OF COPENHAGEN, DENMARK

GEAR-SHIFTING APPARATUS

Application filed January 25, 1929, Serial No. 334,969, and in Denmark January 27, 1928.

This invention relates to gear shifting apparatus for use in automobiles, motor cycles, motor boats, gears for machine tools etc. and is mainly adapted to form a supplement to gear boxes of usual design, viz such provided with one or more axially displaceable gear wheels, for the purpose of making the changing of speed more easy and secure. To this end the shifting of gears according to the invention is effected by the operation of a number of press-buttons, pedals or the like instead of by means of the well known gear shift lever, the manipulation of which is rather complicated.

Another object of the invention is to facilitate the shifting operation by effecting the same by mechanical power, delivered for instance from a motor driven shaft.

Other purposes and advantages of the invention will appear from the following description with reference to the drawing, which by way of example shows two embodiments of mechanical gear shifting apparatus constructed in accordance with the invention which are particularly adapted for use on an automobile where the gear box offers three speeds forward, neutral and one speed reverse.

Figure 1 is a plan view of one embodiment of the gear shifting apparatus,

Figure 2 is a horizontal section of the same along the line C—C in Figure 4,

Figure 3 is a vertical cross-section through the press-button device forming a part of the same gear shifting apparatus, Figure 4 is an end view of the apparatus shown in Figure 1, Figure 5 is a vertical cross-section of the same apparatus along the line A—A in Figure 2, and Figure 6 is a second cross-section along the line B—B in Figure 2, Figures 7-12 are views similar to Figures 1-6 respectively of a modified and more simple embodiment of the invention.

In Figures 7-12 parts corresponding to similar parts in Figures 1-6 are marked with the same numbers.

The gear shifting apparatus shown in Figures 1-6 consists of a rectangular box or casing 55 the open top of which is closed by a removable cover 56, and which during the use of the apparatus is kept filled as much as possible with lubricating oil in order to ensure a smooth and easy operation of the parts working in the box, in the latter a plurality of parallel guiding grooves 57 are formed each of which receives a reciprocatory sliding block. These sliding blocks which are designated by 27, 26, 24, 28 and 29 respectively, are wedge-shaped at their foremost ends and co-operate with a number of locking blocks 25 adapted to slide in a groove 58 perpendicular to the grooves 57. These locking blocks are provided with oppositely inclined faces, and they have such proportions and are found in such a number that one only of the parallel sliding blocks at a time can occupy its foremost or projecting position. Thus in Figure 2 the block 26 is shown in its projecting position while all of the other sliding blocks are in the retracted position. If any one of the retracted blocks is pushed forward some of or all the locking blocks 25 are hereby displaced laterally with the result that the previously projecting sliding block (in the present instance the block 26) is pressed back. The angles which the inclined faces of the blocks form with the sides of the casing preferably are approximately 45°.

The device thus far described is characterized so that a function performed by a previously projected block is done away with or cancelled as soon as a different block is pushed forward for performing its function, and that one of the blocks only at a time can occupy the foremost or projecting position.

A series of press-buttons 1 corresponding each to a separate speed (including neutral) is positioned at a place readily accessible to the driver in case of the gear-shifting apparatus being adapted for use on an automobile. These press-buttons one of which only is shown in Figure 3 are carried by arms rotatable around a common axis and connected by Bowden cables 2, a system of levers or the like each with one of a plurality of arms 3 and 4 all of which are loosely mounted on a shaft 5 rotatably journalled in bearings 59 formed on the above named casing 55, 56.

Of these arms, the one corresponding to neutral of the gear box referred to in the following is designated by 3 while all of the other arms are designated by 4. A rod being parallel to the shaft 5 and rigidly secured to the same extends above the arms 3 and 4 so that upon raising of any one of these arms by depressing the corresponding press-button the shaft 5 will be rocked. This shaft is connected by means of a crank 7, a link 8 and a bell crank lever 9 to a claw-coupling member 10 displaceable along but non-rotatable on a shaft 15. The second claw-coupling member 11 is rigidly secured on a shaft 60, Figure 2, which rotates continuously. The last named shaft, 60 namely, is driven constantly by the engine, for instance indirectly from its crank shaft or from its cam shaft, at a speed of about 40 revolutions per minute corresponding to the speed of the engine during gear shifting (idle running). When the coupling member 10 is engaged with the other coupling member 11 by the rocking of the shaft 5 as described above and has performed one revolution it is disengaged again by means of a cam shaped projection 12 on the coupling member 10 which during the last part of the rotation co-acts with a stationary stud 13, Figure 1, whereby the coupling is released.

A snap ball not shown may retain the coupling member 10 by a comparatively weak force in its disengaged position.

The claw-coupling member 10 is connected with the shaft 15 by a key and groove 14 for the purpose indicated above. A cam disc 16 secured on one end of the shaft 15 can actuate a roller 17 mounted on a two-armed lever 18 which by a link 19 and a bell crank lever 20, Figure 4, is connected with the usual engine clutch not shown on the drawing. When the shaft 15 in the manner explained above is caused to perform one revolution the engine clutch is released by the mechanism described just before the shifting of gears, maintained disengaged during the change of speed and again let in smoothly and gently immediately after the shifting of gears. The circumference of the cam disc 16 is designed so as to obtain this result. If desired this cam disc 16 by means of a suitable transmission system or gearing may be utilized for reducing the supply of fuel to the engine during the shifting of gears.

On the shaft 15 there is also secured a disc 21 having a cam groove 61, Figure 2, engaged by a roller 22 mounted on an impeller rod 23 which can slide within a cavity 62 formed in the casing 55, Figure 5. This impeller rod can only slide in a straight path to and fro in the casing 55 and is guided therein. A shaft 46 is carried through a longitudinal slot in the impeller rod. During each shifting of gears, i. e. during each rotation of the shaft 15 the sliding block 24 is pushed by the impeller rod 23 forward to its projecting position (provided that it does not already occupy this position), and then the previously projecting sliding block is simultaneously pressed back in the manner explained above.

Each of the above mentioned arms 4 is connected by two links 44 with a pawl 45 rotatably mounted on the shaft 46 so that when this pawl is raised and moved forward (to the right hand side on the drawing) it actuates the corresponding sliding block 27, 26, 28 or 29 as the case may be and pushes the same forward. The shaft 46 is by means of two arms 50 rigidly secured to a rotatable shaft 49 having an arm 48 with a roller 47 which engages the above mentioned cam groove 61 in the disc 21. When this disc rotates the shaft 49 is rocked whereby the shaft 46 and all of the pawls 45 carried thereby are moved forward in the casing 55. However, all of these pawls with the exception of one will occupy their lowered position and thus cannot actuate the corresponding sliding blocks, whereas the single raised pawl will push the corresponding sliding block forward.

Each of the blocks 27, 26, 28 and 29 carries a stud 31, 30, 32 and 33 respectively, which project upwards through slots formed in the cover 56 of the casing 55, Figure 6, and the edges of these slots limit the displacement of the blocks in the rearward direction. On the stud 31 is mounted a bell crank lever 34 the shorter arm of which by means of a fork embraces the stud 30 while the longer arm is connected by a link 36 to a stud 38. In a similar manner a bell crank lever 35 is mounted on the stud 33 of the block 29 and by a fork engages the stud 32 of the block 28, the said lever being connected by a link 37 to a stud 39.

These two studs 38 and 39 are secured each upon one of the two shifting rods of a gear box not shown, it being assumed that the gear shifting apparatus is to be used in combination with a gear box of any usual design where the shifting rods by means of shifting forks serve to displace the sliding gears of the gear box to thereby effect the change of speed in the well known manner. The stud 38 in addition to the position shown in full lines in Figure 1 may occupy either of the two positions 40 and 41 shown in dotted lines. Likewise the stud 39 in addition to the position shown in full lines may occupy either of the two positions 42 and 43 shown in dotted lines. The positions 39 and 40 correspond to neutral adjustment of the gears of the gear box while the positions 42 and 43 for instance correspond to third speed and second speed respectively. The position 38 then corresponds for instance to first speed and the position 41 to reverse or backing. Thus when the bell crank levers 34 and 35 occupy the positions shown in Figure 1 the gear box is adjusted to first speed. When both of the longer arms of the bell crank levers are approximately parallel to the sliding blocks 26—29 the gears within the gear box are adjusted in the neutral positions.

During shifting of gears the bell crank levers 34 and 35 are always moved to their mid-position corresponding to neutral before adjustment to the desired speed is effected, this result being obtained automatically.

The gear shifting apparatus thus far described operates in the following way:

If for instance adjustment to second speed is desired the corresponding press-button 1 is depressed whereby the claw-coupling 10, 11 is engaged by means of the parts 2, 4, 6, 5, 7—9 in the manner explained above, and simultaneously the pawl 45 appertaining to the actuated press-button is swung upwards around the shaft 46 in order to be ready to push the corresponding sliding block (in the present example the block 28) forward. During the first sixth of the revolution of the shaft 15 the cam disc 16 in the manner described above releases the engine clutch and eventually besides cuts down the supply of petrol to the engine. During the second sixth revolution of the shaft 15 the impeller rod 23 pushes the sliding block 24 forward so that the previously projecting block 26 is pressed back whereby shifting to neutral is effected. Thereafter the impeller rod 23 is retracted by the cam groove disc 21, and the latter now actuates the roller 47 so that the shaft 46 is moved forward in the box 55 whereby the raised pawl 45 presses the block 28 forward. The sliding block 24 corresponding to neutral is thereby pressed back again, and adjustment to the desired speed (in the example selected: second speed) is thus obtained. During the second half revolution of the shaft 15 the engine clutch is again engaged gently, and the shaft 46 together with the pawl 45 are returned to their original positions. At the automatic releasing of the claw-coupling 10, 11 the rod 6 is moved downward and then depresses the previously raised arm 4 so that there is exerted a pull downward in the Bowden cable 2 connected with that arm.

The press-button depressed by the driver for effecting the desired change of speed is hereby swung up again and thus indicates in a visible manner that the shifting of gears as well as the renewed engagement of the engine clutch have taken place.

If adjustment to another speed (with the exception of neutral) is to be effected the apparatus operates in an analogous way. In case the press-button corresponding to neutral is depressed the arm 3 is raised, and hereby the engine clutch is released and adjustment to neutral effected by means of the impeller rod 23. Although the pawls 45 are also moved forward in the casing 55 at a somewhat later movement, yet since none of them are raised they cannot actuate the corresponding sliding blocks.

The engine clutch then is again engaged automatically in the same way as set forth above.

A helical spring 53, Figures 1 and 2, stretched between a stationary part of the apparatus and the crank 7 of the shaft 5 serves for retaining the pawls 45 in their positions as long as the press-buttons 1 are not operated.

A second spring 54 stretched between a stud on the cam disc 16 and a stationary part of the apparatus serves for ensuring that the cam-shaped projection 12 is always completely disengaged from the stud 13 during the releasing of the coupling member 10 in order that this stud 13 shall not prevent a following renewed coupling together of the coupling members.

The bell crank levers 34 and 35 may eventually be retained in either of their three operative positions by means of snap ball locks not shown. The gear box shifting rods upon which the studs 38 and 39 are secured and which serve to disengage and engage the gears of the gear box are usually retained in the predetermined working positions by means of spring-pressed locking members. The pawls 45 have inclined foremost faces as shown in Figure 6 in order that they may be pressed downwards if the corresponding sliding blocks for one reason or other should meet with a too great resistance when an attempt is made to shift the gears.

The embodiment of the gear shifting apparatus shown in Figures 7–12 is arranged and operates in the same manner as that just described with the following exceptions:

To simplify the apparatus the sliding blocks 24, 26, 27, 28, 29 and the locking blocks 25 used in the apparatus illustrated in Figures 1–6 have been omitted, and the gear shifting levers here formed as a T and designated by 34ª and 35ª respectively are adapted to be directly actuated and adjusted by the vertically swingable pushing pawls 45ª. These pawls may be swung and pushed forward and retracted exactly in the same manner and by the same means as explained above with reference to the pawls 45. Furthermore a displaceable impeller rod 23ª is operated by the cam groove disc 21 in a similar manner as the rod 23.

The levers 34ª and 35ª are not floating levers but they are mounted to swing on fixed pivots 65 and 66 respectively. The two shorter arms of each lever carry an upper stud or projection 67 or 68 and a lower conical stud 69. Thus it will be understood that each such conical stud 69 is positioned in the path of the foremost end of one of the pushing pawls 45ª as shown somewhat diagrammatically in Figure 8.

A neutral setting rocking plate 70 is mounted to swing on fixed pivots 71, and this plate having its undermost longitudinal edge arranged at a slightly higher level than the levers is adapted to act upon the studs 67 and 68 for the purpose indicated in the following. The rocking plate 70 has a single dependent nose 72 projecting into the groove in which the impeller rod 23ª works as clearly illustrated in Figures 8 and 11.

Assuming that a change of speed is desired, then by depressing the press-button 1 corresponding to the desired speed the impeller rod 23ª will first move forward and by engaging the nose 72 rock the plate 70 which in turn by acting on one of the studs 67, 67 and 68, 68, swings the lever previously controlling the setting of the gear wheels in the gear box thereby adjusting the levers in their parallel mid positions and effecting neutral setting of the gear. Thereupon the impeller rod 23ª is again retracted, and the pushing pawls 45ª now move forward in the casing or box 55 so that the single raised pawl associated with the operated press-button actuates the corresponding cone-shaped stud 69 thereby swinging the lever in question and effecting gear shifting to the desired speed.

In other respects the apparatus operates in the same manner as does the embodiment shown in Figures 1-6.

In the construction last described no sliding locking blocks are used for preventing incorrect operation of the apparatus, such as depression of two press-buttons simultaneously, but in this case the ordinary locking means usually provided in modern gear boxes is relied upon to prevent one gear shifting rod from leaving its neutral position as soon as the other gear shifting rod has left its neutral position.

On the other hand the gear shifting apparatus shown in Figures 1-6 involves the advantages consisting partly in the additional locking effect afforded by the system of slidable blocks and partly in the possibility of making the apparatus shorter without altering the range of movement of the gear shifting rods of the gear box, since the levers 34 and 35 can here swing each alternately on to floating pivots.

Having thus fully described my invention I claim as new and desire to secure by Letters Patent:

1. A mechanical gear shifting apparatus for shifting at least one displaceable gear wheel of a gear box, comprising a plurality of selectively adjustable control members adapted to be moved by the operator and corresponding each to a separate speed, a plurality of blocks slidable in parallel paths, locking members movable transversely of said paths and coacting with said slidable blocks to prevent the pushing forward of more than one block at a time, means including said selectively adjustable control members for pushing forward anyone of the slidable blocks, and means including at least one lever rotatably connected with two blocks for transferring the motion of the block thus pushed forward to a displaceable gear wheel of the gear box to thereby shift the gear.

2. A mechanical gear shifting apparatus for shifting at least one displaceable gear wheel of a gear box, comprising a plurality of selectively adjustable control members adapted to be moved by the operator and corresponding each to a separate speed, a plurality of blocks slidable in parallel paths, locking members movable transversely of said paths and coacting with said slidable blocks to prevent the pushing forward of more than one block at a time, power driven means, means which upon operation of anyone of the control members prepares the pushing forward of the corresponding slidable block and then by taking off power from said power driven means actually effects such movement of the block, and means for transferring the motion of the same to a displaceable gear wheel of the gear box to thereby shift the gear.

3. A mechanical gear shifting apparatus for a gear box offering a distinct number of different speeds, comprising a plurality of selectively adjustable control members adapted to be actuated by the operator and corresponding each to a separate speed, a series of swingable and bodily movable pawls connected each with one of the said control members and adapted to swing from an inactive position to an active position, levers adapted to be connected with the gear box and to be adjusted by the said pawls, actuating means for these pawls, and means which upon operation of any one of the said control members to thereby swing the corresponding pawl from the inactive position to the active position derives power from a source of power for causing said actuating means to bodily move the pawl thus swung which in turn causes a movement of one of the levers and thereby effect the gear shifting.

4. The gear shifting apparatus of claim 3, in which said means for taking off power from a source of power includes a rod swingable around an axis parallel with itself, a series of swingable links connected each with a control member and with a pawl, said rod overlying said links, a power driven shaft and one-revolution coupling, so that upon operation of any one of the said control members the rod is swung by the corresponding link and lets in the said coupling for the purpose of driving the said pawl actuating means.

5. The gear shifting apparatus of claim 3 adapted for use in connection with a gear box offering a neutral position, further including a cam disc, a pushing rod connected therewith and means actuated by said pushing rod for adjusting the gear in neutral position before shifting to a different speed is effected.

6. The gear shiftng apparatus of claim 3, in which the said actuating means for the pawls comprises a common shaft arranged transversely of the pawls and upon which these are rotatably mounted at their rearmost ends, a cam and a lever system connecting the said cam with the said common shaft so that on rotation of the cam the said shaft with all the pawls are moved bodily.

7. A mechanical gear shifting apparatus for shifting at least one displaceable gear wheel of a gear box, comprising a plurality of selectively adjustable control members adapted to be moved by the operator and corresponding each to a separate speed, a plurality of blocks associated each with one of said control members and slidable in parallel paths, locking members movable transversely of said paths and coacting with said slidable blocks to prevent more than one block at a time from entering into the foremost position and to effect the pushing backward of any block occupying that position upon the pushing forward of a different block, means including said selectively adjustable control members for pushing forward anyone of the slidable blocks, and means for transferring the motion of the block thus pushed forward to a displaceable gear wheel of the gear box to thereby shift the gear.

In testimony whereof I have affixed my signature.

JAKOB JAKOBSEN LILDAL.